United States Patent
Yang et al.

(12)

(10) Patent No.: US 9,499,068 B2
(45) Date of Patent: Nov. 22, 2016

(54) BATTERY PACK

(71) Applicant: SAMSUNG SDI CO., LTD., Yongin-si, Gyeonggi-do (KR)

(72) Inventors: Seung-Woo Yang, Yongin-si (KR); In-Hwan Cha, Yongin-si (KR); Jang-Gun Ahn, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 346 days.

(21) Appl. No.: 14/183,833

(22) Filed: Feb. 19, 2014

(65) Prior Publication Data

US 2014/0356662 A1 Dec. 4, 2014

(30) Foreign Application Priority Data

May 29, 2013 (KR) .................. 10-2013-0061185

(51) Int. Cl.
| | |
|---|---|
| *H01M 10/6556* | (2014.01) |
| *H01M 10/647* | (2014.01) |
| *H01M 10/6563* | (2014.01) |
| *B60L 11/18* | (2006.01) |
| *H01M 10/625* | (2014.01) |
| *H01M 10/613* | (2014.01) |
| *H01M 2/10* | (2006.01) |

(52) U.S. Cl.
CPC ........ *B60L 11/1874* (2013.01); *B60L 11/1864* (2013.01); *B60L 11/1879* (2013.01); *H01M 10/625* (2015.04); *H01M 10/647* (2015.04); *H01M 10/6556* (2015.04); *H01M 10/6563* (2015.04); *B60L 2240/545* (2013.01); *H01M 2/1077* (2013.01); *H01M 10/613* (2015.04); *Y02T 10/7005* (2013.01); *Y02T 10/7061* (2013.01)

(58) Field of Classification Search
None
See application file for complete search history.

(56) References Cited

U.S. PATENT DOCUMENTS

| 5,589,290 | A | 12/1996 | Klink et al. |
| 6,225,788 | B1 * | 5/2001 | Kouzu ................ H01M 2/1077 |
| | | | 320/150 |

(Continued)

FOREIGN PATENT DOCUMENTS

| EP | 0964470 A1 | 12/1999 |
| EP | 1750322 A2 | 2/2007 |
| KR | 10-0250704 B1 | 1/2000 |
| KR | 10-2007-0088994 A | 8/2007 |

(Continued)

OTHER PUBLICATIONS

European Office Action dated Feb. 3, 2016.

(Continued)

*Primary Examiner* — Jonathan Crepeau
(74) *Attorney, Agent, or Firm* — Lee & Morse, P.C.

(57) ABSTRACT

A battery pack includes a first battery module group including one or more battery modules, a second battery module group including one or more battery modules, the second battery module group being aligned with the first battery module group, a guide member between the first and second battery module groups, two or more support members that support bottom surfaces of the battery modules of the first and second battery module groups, the two or more support members being spaced apart from each other, and a housing that accommodates the first and second battery module groups therein. The guide member is provided to a battery module of the first battery module group adjacent to the second battery module group so as to change a flow path of a heat exchange medium passing through the first battery module group.

18 Claims, 8 Drawing Sheets

(56) References Cited

U.S. PATENT DOCUMENTS

2009/0120620 A1 5/2009 Abe et al.
2013/0143081 A1 6/2013 Watanabe et al.

FOREIGN PATENT DOCUMENTS

| KR | 10-2011-0044387 A | 4/2011 |
|---|---|---|
| WO | WO-2007/007503 A1 | 1/2007 |
| WO | WO 2007/097594 A1 | 8/2007 |
| WO | WO-2012/018067 A1 | 2/2012 |

OTHER PUBLICATIONS

European Search Report dated Jul. 16, 2014.

* cited by examiner

BATTERY PACK

CROSS-REFERENCE TO RELATED APPLICATION

Korean Patent Application No. 10-2013-0061185, filed on May 29, 2013, in the Korean Intellectual Property Office, and entitled: "Battery Pack," is incorporated by reference herein in its entirety.

BACKGROUND

1. Field

Embodiments relate to a battery pack.

2. Description of the Related Art

A high-power battery module using a non-aqueous electrolyte with high energy density has recently been developed. The high-power battery module is configured as a large-capacity battery module manufactured by connecting a plurality of battery cells in series so as to be used in driving motors of devices requiring high power, e.g., electric vehicles and the like. Further, a battery pack may be configured by electrically connecting such a plurality of battery modules to one another.

SUMMARY

Embodiments are directed to a battery pack including a first battery module group including one or more battery modules, a second battery module group including one or more battery modules, the second battery module group being aligned with the first battery module group, a guide member between the first and second battery module groups, two or more support members that support bottom surfaces of the battery modules of the first and second battery module groups, the two or more support members being spaced apart from each other, and a housing that accommodates the first and second battery module groups therein. The guide member is provided to a battery module of the first battery module group adjacent to the second battery module group so as to change a flow path of a heat exchange medium passing through the first battery module group.

The battery pack may further include a bottom member at a lower portion of the battery module adjacent to the guide member.

A height of the bottom member may correspond to that of the support member.

The first and second battery module groups may be aligned in a first direction so that side surfaces of the battery modules of the first and second battery module groups are opposite to each other. The support members may extend in the first direction to collectively support the first and second battery module groups.

The support members may include first and second support members arranged in parallel with each other.

The battery modules of the first and second battery module groups may be mounted and fixed on the support members.

The guide member may be provided to a side surface of the battery module of the first battery module group adjacent to the second battery module group. The guide member may include a base portion opposite to the side surface of the battery module of the first battery module group adjacent to the second battery module group, and first and second flange portions respectively at one side and the other side of the base portion.

The base portion may have an upper end connected to the battery module and a lower end inclined to be spaced apart from the battery module. The first and second flange portions may extend toward the battery module at the one side and the other side of the base portion.

At least portions of the first and second flange portions may have a rounded shape.

A vertical length from an upper end to a lower end of the base portion may be about 60 to about 80% of the height of the battery module.

The guide member may be provided to a side surface of the battery module of the first battery module group adjacent to the second battery module group. The guide member may include a base portion opposite to the side surface of the battery module of the first battery module group adjacent to the second battery module group, an upper flange portion extending toward the battery module of the first battery module group adjacent to the second battery module group at an upper portion of the base portion, and first and second flange portions extended toward the battery module of the first battery module group adjacent to the second battery module group at one side and an other side of the base portion, the first and second flange portions coming in contact with the upper flange portion.

The guide member may further include a joining portion that extends through the first flange portion, the upper flange portion, and the second flange portion. The joining portion may be connected to the side surface of the battery module of the first battery module group.

The battery pack may further include at least one side member. The side member may be provided between an inner surface of the housing and the battery module of the second battery module group adjacent to the first battery module group.

The battery modules of the first battery module group may be spaced apart from each other by a first distance. The battery modules of the second battery module group are spaced apart from each other by a second distance. The first and second battery module groups may be spaced apart from each other by a third distance. The third distance may be greater than the first or second distance.

The battery pack may further include a first main heat exchange flow path that passes through the first battery module group, a first sub-heat exchange flow path that passes between the neighboring support members at a lower portion of the first battery module group, a first convergence heat exchange flow path that passes between neighboring support members at a lower portion of the second battery module group, one or more second heat exchange flow paths that pass between an outer surface of the first battery module group and an inner surface of the housing, and a second convergence heat exchange flow path that passes through the second battery module group. The first main heat exchange flow path and the first sub-heat exchange flow path may combine to form a first heat exchange flow path such that the first heat exchange flow path is connected to the first convergence heat exchange flow path by the guide member. The one or more second heat exchange flow paths may combine to form the second convergence heat exchange flow path at a rear stage of the guide member.

The one or more second sub-heat exchange flow paths may combine with the first main heat exchange flow path at a front stage of the bottom member so as to become the first heat exchange flow path. The first heat exchange flow path is connected to the first convergence heat exchange flow path by the guide member.

The housing may include a first surface having an inlet formed therein, and a second surface opposite to the first surface, the second surface having an outlet formed therein. The first and second battery module groups may be sequentially aligned between the inlet and the outlet. the first and second battery module groups include battery modules with side surfaces that are opposite to the inlet and the outlet.

The inlet may include a main inlet at a central portion thereof and one or more sub-inlets respectively provided at left and right sides of the main inlet while being spaced apart from each other with the main inlet interposed therebetween.

The first main heat exchange flow path and the first sub-heat exchange flow path may communicate with the main inlet. The one or more second heat exchange flow paths may communicate with the sub-inlet. The first and second convergence heat exchange flow paths may communicate with the outlet.

A heat exchange medium that flows into the battery pack through the main inlet flows through the first main heat exchange flow path and the first sub-heat exchange flow path. The heat exchange medium that flows into the battery pack through the sub-inlet flows through the one or more second heat exchange flow paths.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
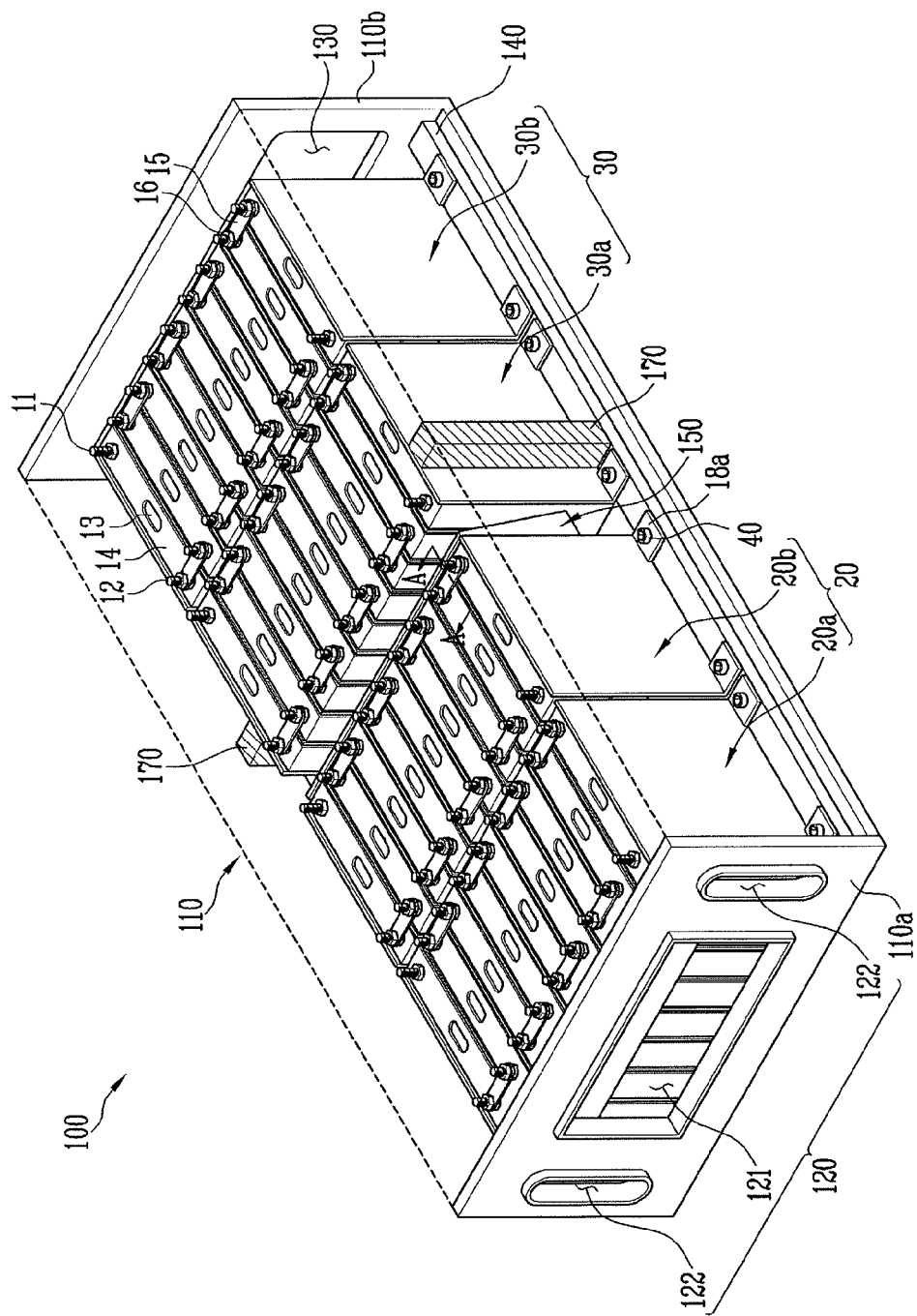
FIG. 1 illustrates a perspective view of a battery pack according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of features may be exaggerated for clarity of illustration. Like reference numerals refer to like elements throughout.

Figure 2:
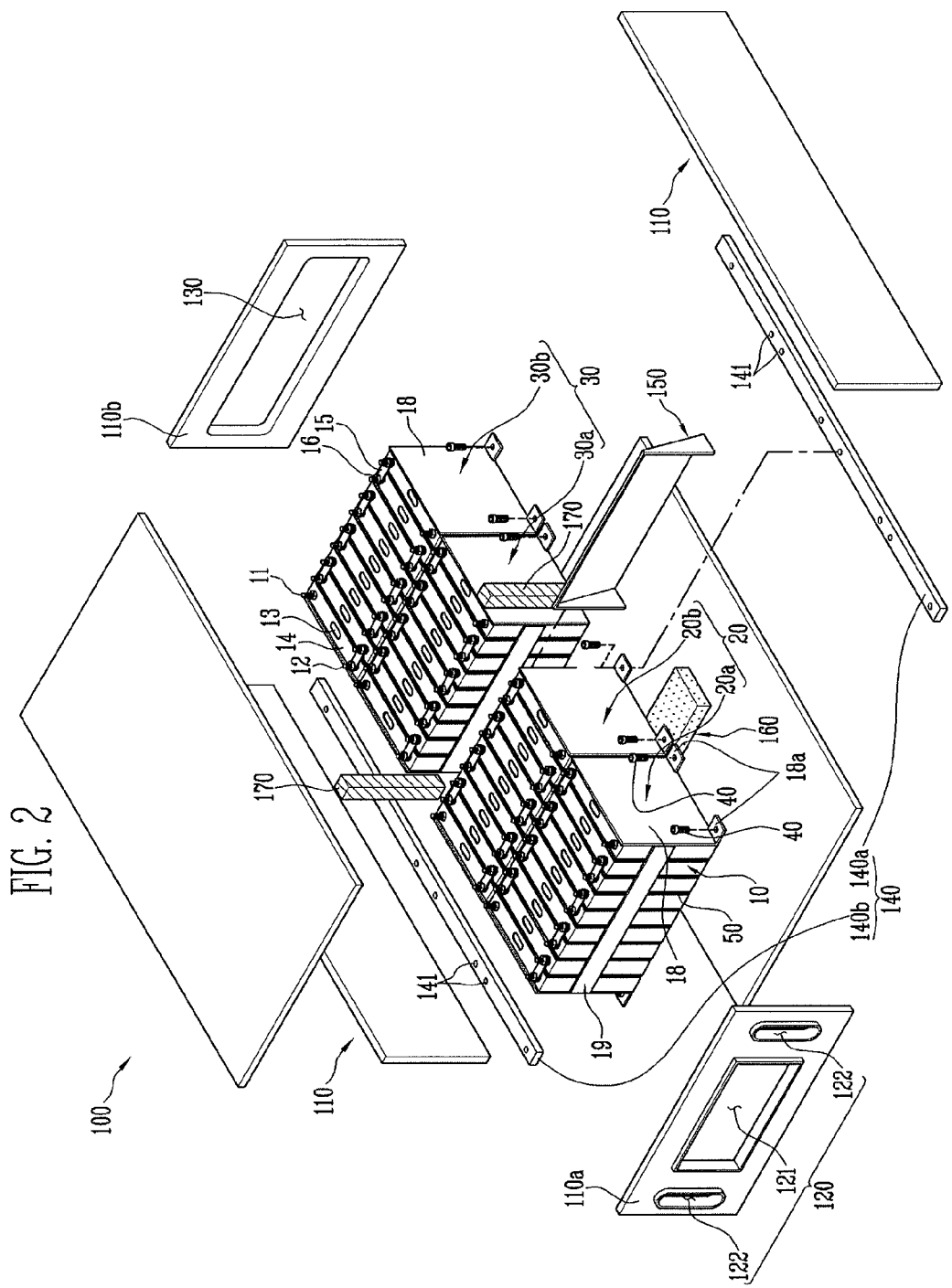
FIG. 2 illustrates an exploded perspective view of the battery pack illustrated in FIG. 1.

FIG. 1 illustrates a perspective view of a battery pack according to an embodiment. FIG. 2 illustrates an exploded perspective view of the battery pack illustrated in FIG. 1.

The battery pack 100 according to this embodiment includes a first battery module group 20 configured to include one or more battery modules 20a and 20b; a second battery group module 30 configured to include one or more battery modules 30a and 30b; a guide member 150 provided between the first and second battery module groups 20 and 30; two or more support members 140 configured to support bottom surfaces of the battery modules 20a, 20b, 30a and 30b while being spaced apart from each other; and a housing 110 configured to accommodate the first and second battery module groups 20 and 30 therein. The guide member 150 may be provided to the battery module 20b of the first battery module group 20 adjacent to the second battery module group 30, so as to change the flow path of a heat exchange medium passing through the first battery module group 20.

The battery pack 100 may further include a bottom member 160 (see FIG. 2) provided at a lower portion of the battery module 20b adjacent to the guide member 150, and one or more side members 170. The side members 170 may be provided between an inner surface of the housing 110 and the battery module 30a of the second battery module group 30 adjacent to the first battery module group 20.

The battery pack 100 may be provided by aligning the first and second battery module groups 20 and 30 therein. In this case, the first battery module group 20 may include one or more battery modules 20a and 20b, and the second battery module group 30 may include one or more battery modules 30a and 30b. Each of the battery modules 20a, 20b, 30a, and 30b of the first and second battery module groups 20 and 30 may be formed by aligning a plurality of battery cells 10 and then fixing the aligned battery cells 10 with a pair of end plates 18 and a pair of connection members 19. A partition wall 50 may be provided between neighboring battery cells 10. The partition wall 50 may allow the battery cells 10 to be spaced apart from each other, thereby forming a space between the neighboring battery cells 10.

The battery cell 10 may include a battery case, and an electrode assembly and an electrolyte accommodated in the battery case. The battery case may be hermetically sealed with a cap assembly 14 having a positive electrode terminal 11, a negative electrode terminal 12 and a vent 13. The electrode assembly and the electrolyte may generate electrochemical energy through a reaction therebetween, and the generated energy may be transferred to the outside of the battery cell 10 through the positive and negative electrode terminals 11 and 12. The positive and negative electrode terminals 11 and 12 of neighboring battery cells 10 may be electrically connected to each other through a bus-bar 15. The bus-bar 15 may be fixed to the positive and negative electrode terminals 11 and 12, using a member such as a nut 16. The vent 13 may act as a safety device of the battery cell 10 to provide a passage through which gas generated inside the battery cell 10 is exhausted to the outside of the battery cell 10.

The housing 110 may accommodate the first and second battery module groups 20 and 30 therein. A heat exchange medium configured to perform a heat exchange with the battery cell 10 so as to control the temperature of the battery cell 10 may be provided inside the housing 110. The housing 110 may include a first surface 110a having an inlet 120 formed therein, and a second surface 110b opposite to the first surface 110a and having an outlet 130 formed therein. The first and second battery module groups 20 and 30 may be sequentially aligned between the inlet and outlet 120 and 130. Side surfaces of the battery modules 20a, 20b, 30a, and 30b of the first and second battery module groups 20 and 30 may face the inlet and outlet 120 and 130.

For example, the first battery module group 20 may include first and second battery modules 20a and 20b sequentially provided therein, and the second battery module group 30 may include third and fourth battery modules 30a and 30b sequentially provided therein. The first to fourth battery modules 20a, 20b, 30a, and 30b may be sequentially aligned between the inlet and outlet 120 and 130. Thus, the first battery module 20a may be adjacent to the inlet 120, and the fourth battery module 30b may be adjacent to the outlet 130. The first to fourth battery modules 20a, 20b, 30a, and 30b are provided as examples for ease of description. It is to be understood that the number of battery modules constituting the first and second battery module groups 20 and 30 may be variously modified.

The battery pack 100 according to this embodiment may include a guide member 150 and a bottom member 160 provided at a lower portion of the battery module 20b to which the guide member 150 is provided. In this case, lower portions of the first to fourth battery modules 20a, 20b, 30a, and 30b may be supported by one or more support members 140. For example, the support member 140 may include first and second support members 140a and 140b. The first and second battery module groups 20 and 30 may be aligned in a first direction so that side surfaces of the battery modules 20a, 20b, 30a, and 30b of the first and second battery module groups 20 and 30 face each other. The first and second support members 140a and 140 may extend in the first direction to collectively support the first and second battery module groups 20 and 30.

Mounting portions 18a bent in the opposite direction with respect to the battery cells 10 may be provided at lower portions of the pair of end plates 18 fixing the battery modules 20a, 20b, 30a, and 30b. The mounting portions 18a may be mounted on the first and second support members 140a and 140b. Accordingly, the battery modules 20a, 20b, 30a, and 30b may be spaced apart from each other as high as the height of each of the first and second support members 140a and 140b from a bottom surface of the housing 110. In addition, through-holes 141 corresponding to the respective mounting portions 18a may be provided in the first and second support members 140a and 140b. The mounting portion 18a and the through-hole 141 may be fastened to each other using a bolt 40 or the like. Thus, the battery modules 20a, 20b, 30a, and 30b of the first and second battery module groups 20 and 30 may be mounted and fixed on the support member 140.

The battery pack 100 may further include one or more bottom members 160 provided at the lower portion of the battery module 20b of the first battery module group 20. For example, the bottom member 160 may be provided at the lower portion of the battery module 20b adjacent to the guide member 150. The second battery module 20 may be supported by the first and second support members 140a and 140b, and the bottom member 160 may be provided in a separate space between the first and second support members 140a and 140b. The height of the bottom member 160 may be provided to correspond to that of the support member 140, so that the bottom member 160 may support the second battery module 20b while keeping balance with the support member 140.

The battery pack 100 may further include one or more side members 170. The side member 170 may be provided between an inner surface of the housing 110 and the battery module 30a of the second battery module group 30 adjacent to the first battery module group 20. For example, the side member 170 may be mounted on the support member 140 so as to block the space between the third battery module 30a and the inner surface of the housing 110.

Figure 3A:
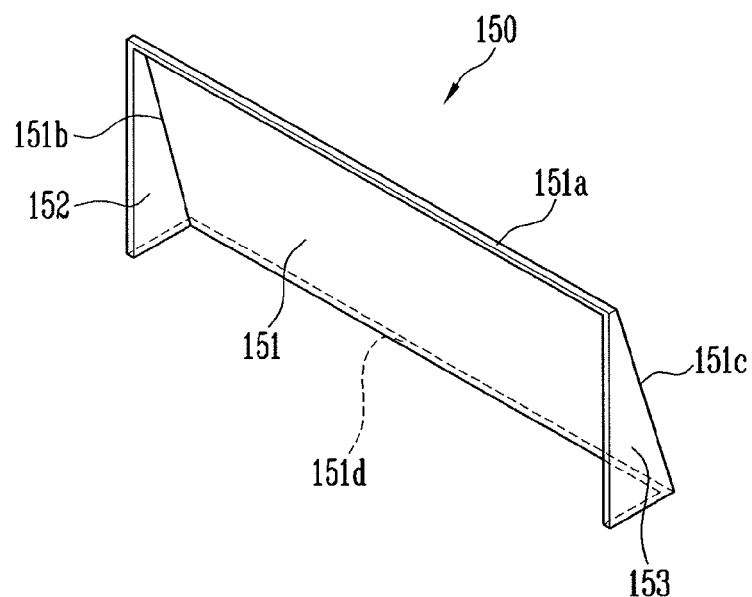
FIG. 3A illustrates a perspective view of a guide member illustrated in FIG. 2.
Figure 3B:
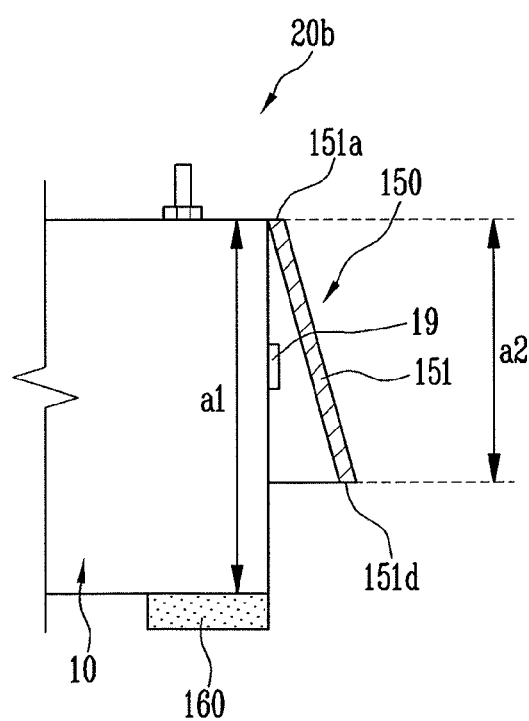
FIG. 3B illustrates a sectional view taken along line A-A of a battery module illustrated in FIG. 1.

FIG. 3A illustrates a perspective view of the guide member of FIG. 2. FIG. 3B is a sectional view taken along line A-A of a battery module in FIG. 1.

Referring to FIGS. 3A and 3B, the guide member 150 may is provided at a side surface of the battery module 20b of the first battery module group 20, and may include a base portion 151 configured to face the side surface of the battery module 20b, and first and second flange portions 152 and 153 respectively provided at one side 151b and the other side 151c of the base portion 151. An upper end 151a of the base portion 151 is connected to the battery module 20b, and a lower end 151d of the base portion 151 is inclined to be spaced apart from the battery module 20b. The first flange portion 152 may extend toward the battery module 20b from the one side 151b of the base portion 151, and the second flange portion 153 may extend toward the battery module 20b from the other side 151c of the base portion 151. For example, the first and second flange portions 152 and 153 may be provided in the shape of a triangle or trapezoid that has a lower end wider than an upper end thereof.

The base portion 151 is connected to the battery module 20b so as to be inclined with respect to the battery module 20b. The vertical length a2 from the upper end 151a to the lower end 151d of the base portion 151 may be about 60 to about 80% of the height a1 of the battery module 20b. In a case where the vertical length a2 from the upper end 151a to the lower end 151d of the base portion 151 is less than 60% of the height a1 of the battery module 20b, the flow path of the heat exchange medium passing through the battery module 20b may have difficulty in being sufficiently changed to be directed toward the lower portion of the battery module 20b. Accordingly, the heat exchange medium which has passed through the first battery module group 20, i.e., a considerable amount of the heat exchange medium heat-exchanged with the battery cells 10 may pass through the second battery module group 30 subsequent to the first battery module group 20, and therefore, the improvement of heat exchange efficiency of the battery pack may be insignificant. On the other hand, in a case where the vertical length a2 from the upper end 151a to the lower end 151d of the base portion 151 exceeds 80% of the height a1 of the battery module 20b, the pressure of the heat exchange medium in the guide member 150 may be increased. In a serious case, the heat exchange medium passing through the battery module 20b may flow backward to return to the battery module 20b, thereby lowering the cooling performance of the battery pack. In an implementation, the vertical length a2 from the upper end 151a to the lower end 151d of the base portion 151 may be 70% of the height a1 of the battery module 20b.

Figure 4:
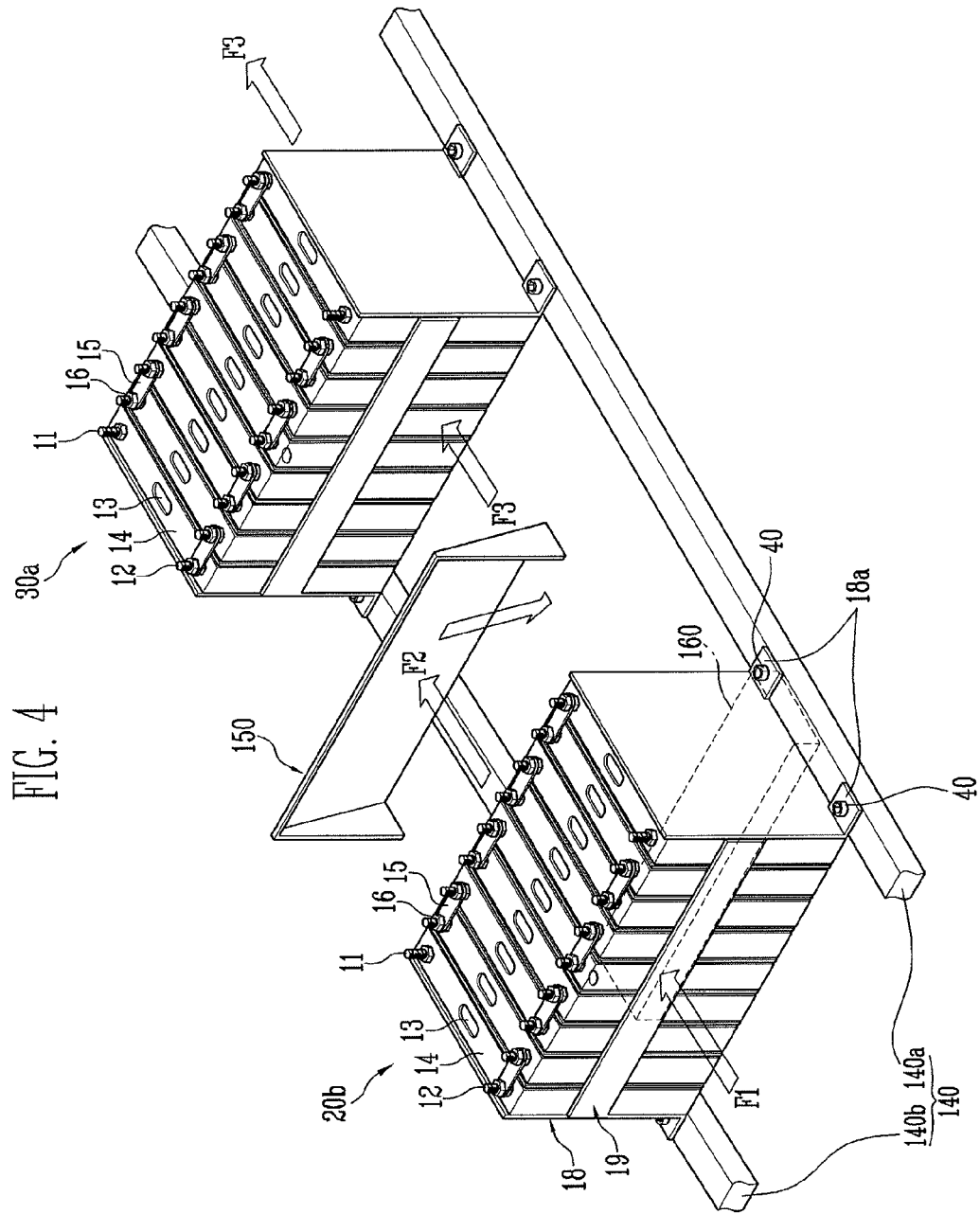
FIG. 4 illustrates a perspective view showing a battery module, the guide member, a support member, and a bottom member according to the embodiment.

FIG. 4 illustrates a perspective view showing the battery module, the guide member, the support member, and the bottom member according to the embodiment.

Referring to FIG. 4, the heat exchange medium may pass through the first battery module group (F1), and the flow path of the heat exchange medium may be changed so that the heat exchange medium is directed toward the lower portion of the second battery module 20b by the guide member 150 (F2). In this case, the heat exchange medium may be prevented from flowing backward to the first battery module group by the bottom member 160 provided at the lower portion of the second battery module 20b, and may advance toward the second battery module group. The heat exchange medium may pass through the lower portion of the third battery module 30a adjacent to the second battery module 20b and through the space between the first and second support members 140a and 140b spaced apart from each other (F3). Thus, the heat exchange medium, having an increase temperature to being heat-exchanged with the first battery module group does not pass through the second battery module group, and is discharged to the outside of the battery pack through the lower portion of the second battery module group.

Generally, a battery cell generates heat through charging/discharging thereof. Without a cooling device, the heat may accumulated, such that the battery cell may be degraded. In a battery module including a plurality of battery cells, the heat generated in the plurality of battery cells may be transferred to neighboring battery cells, which may accelerate the degradation of the battery cells. In a serious case, there may be a risk of explosion. Particularly, In a high-capacity battery pack, the amount of heat generated is increased, and the risk of serious problems due to heat is increased. In order to address such issues, a cooling device may be provided in the battery pack. In this regard, it may be difficult to control temperatures of the plurality of battery cells to be uniform due to the structure of the battery pack, which may cause a difference in temperature between the battery cells. In addition, an imbalance in the flow of a heat exchange medium passing through spaces between the respective battery cells may occur, and a difference in pressure between inflow and discharge portions of the heat exchange medium may occur, thereby lowering the heat exchange efficiency of the battery pack.

Embodiments provide a battery pack using a guide member, a new bottom member, a new support member, as described herein, and the flow of a heat exchange medium in a housing may be efficiently controlled by the guide member, the bottom member, and the support member. Thus, a plurality of battery cells provided in the battery pack may be uniformly cooled down. Accordingly, a difference in temperature between the battery cells may be avoided, and the battery cells may be effectively cooled down, thereby reducing the operating cost of the battery pack. Further, the flow of the heat exchange medium may be uniform. Accordingly, a difference in pressure according to the position of the heat exchange medium may be avoided. Thus, no portion at which the pressure is increased may exist, so that the battery pack may be safely used for a long period of time.

Figure 5:
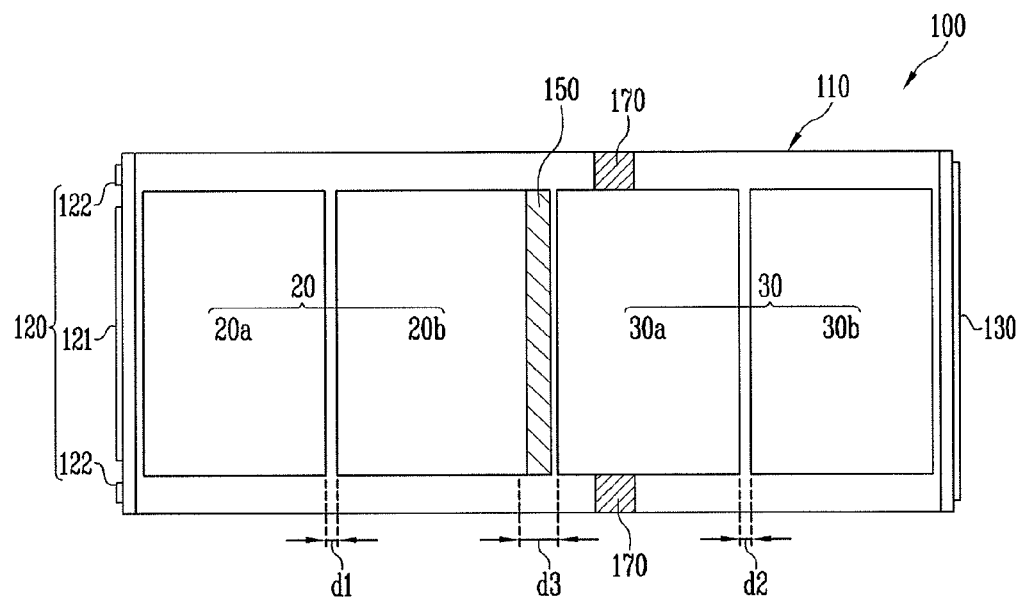
FIG. 5 illustrates a schematic view showing an inside of the battery pack according to the embodiment.

FIG. 5 illustrates a schematic view showing an inside of the battery pack according to the embodiment.

Referring to FIG. 5, the battery modules 20a and 20b of the first battery module group 20 are spaced apart from each other at a first distance d1, and the battery modules 30a and 30b of the second battery module group 30 are spaced apart from each other at a second distance d2. The first and second battery module groups 20 and 30 are spaced apart from each other at a third distance d3. In this case, the third distance d3 may be provided greater than the first or second distance d1 or d2. The third distance d3 may be approximately similar to or greater than the breadth of the guide member 150.

Thus, the heat exchange medium may pass through the first and second battery modules 20a and 20b and then pass through the lower portion of the second battery module group 30 as directed by the guide member 150. The heat exchange medium passing between an outer surface of the first battery module group 20 and an inner surface of the housing 110, i.e., the heat exchange medium not heat-exchanged with the first and second battery modules 20a and 20b may be blocked by the side member 170, and therefore, the flow path of the heat exchange medium may be changed. Accordingly, the heat exchange medium may pass through the third and fourth battery modules 30a and 30b through the space between the first and second battery module groups 20 and 30. In this case, the third distance d3 between the first and second battery module groups 20 and 30 is provided relatively greater than the first or second distance d1 or d2, and thus the heat exchange medium passing between the outer surface of the first battery module group 20 and the inner surface of the housing 110 may easily pass through the second battery module group 30.

Figure 6:
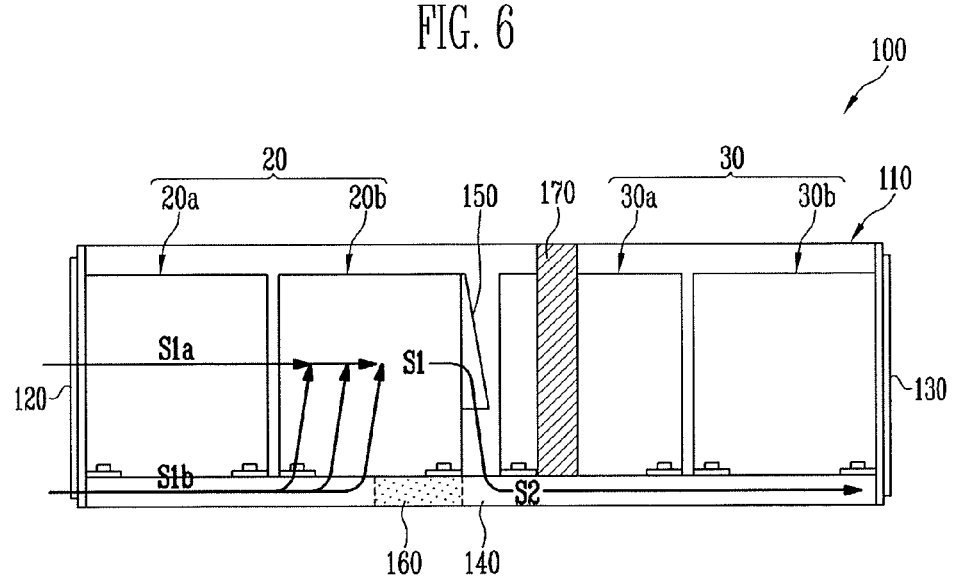
FIG. 6 illustrates a schematic view showing a heat exchange between a heat exchange medium and a first battery module group in the battery pack according to the embodiment.
Figure 7:
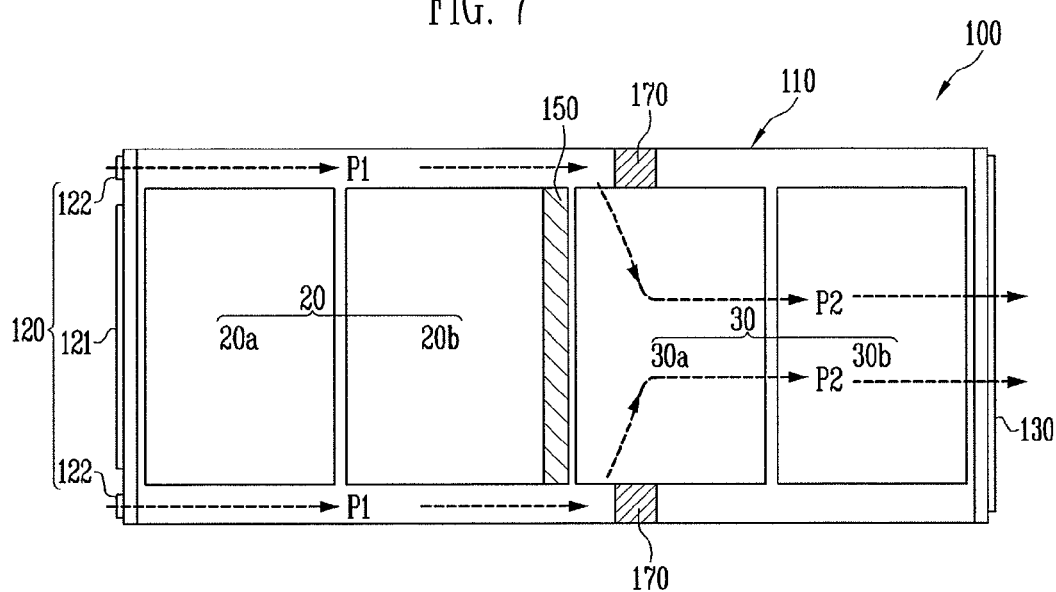
FIG. 7 illustrates a schematic view showing a heat exchange between the heat exchange medium and a second battery module group in the battery pack according to the embodiment.

FIG. 6 illustrates a schematic view showing a heat exchange between the heat exchange medium and the first battery module group in the battery pack according to the embodiment. FIG. 7 illustrates a schematic view showing a heat exchange between the heat exchange medium and the second battery module group in the battery pack according to the embodiment.

Referring to FIGS. 6 and 7, the battery pack according to this embodiment may include a first main heat exchange flow path S1a configured to pass through the first battery module group 20, a first sub-heat exchange flow path S1b configured to pass between the neighboring support members 140 at the lower portion of the first battery module group 20, a first convergence heat exchange flow path S2 configured to pass between the neighboring support members 140 at the lower portion of the second battery module group 30, one or more second heat exchange flow paths P1 configured to pass between the outer surface of the first battery module group 20 and the inner surface of the housing 110, and a second convergence heat exchange flow path P2 configured to pass through the second battery module group 30. The first main heat exchange flow path S1a and the first sub-heat exchange flow path S1b may converge r as a first heat exchange flow path S1 so that the first heat exchange flow path S1 may be connected to the first convergence heat exchange flow path S2 by the guide member 150. The one or more second heat exchange flow paths P1 may converge as the second convergence heat exchange flow path P2 at a rear stage of the guide member 150. The second sub-heat exchange flow path S1b may converge with the first main heat exchange flow path S1a at a front stage of the bottom member 160 so as to become the first heat exchange flow path S1. The first heat exchange flow path S1 may be connected to the first convergence heat exchange flow path S2 by the guide member 150.

The side member 170 may be further provided between the inner surface of the housing 110 and the third battery module 30a of the second battery module group 30 adjacent to the first battery module group 20. Thus, the second heat exchange flow path P1 may be changed by the side member 170 while passing between the outer surface of the first battery module group 20 and the inner surface of the housing 110, so as to be directed between the first and second module groups. For example, the second heat exchange flow paths P1 respectively passing along one outer surface and the other outer surface of the first battery module group 20 may converge as the second convergence heat exchange flow path P2 such that the second convergence heat exchange flow path P2 may be heat-exchanged with the second battery module group 30 by passing through the second battery module group 30.

The housing 110 may include a first surface 110a having the inlet 120 formed therein, and a second surface 110b opposite to the first surface 110a and having the outlet 130 formed therein. The first and second battery module groups 20 and 30 may be sequentially aligned between the inlet 120 and the outlet 130. In this case, the sides of the battery modules 20a, 20b, 30a, and 30b may face the inlet 120 and the outlet 130. For example, the inlet 120 may include a main inlet 121 provided at a central portion thereof, and one or more sub-inlets 122 respectively provided at the left and right sides of the main inlet 121 while being spaced apart from each other with the main inlet 121 interposed therebetween. The outlet 130 may be integrally formed to be opposite to the main inlet 121 and the sub-inlets 122.

The first and second battery module groups 20 and 30 may be provided to be spaced apart from the inner surface of the housing 110. The main inlet 121 may be provided to face the first and second battery module groups 20 and 30, and the sub-inlet 122 may be provided to communicate with spaces between the inner surface of the housing 110 and the first and second battery module groups 20 and 30. That is, the first main heat exchange flow path S1a and the first sub-heat exchange flow path S1b may communicate with the main inlet 121, and the second heat exchange flow path P1 may communicate with the sub-inlets 122. The first and second convergence heat exchange flow paths S2 and P2 communicate with the outlet 130. Thus, the heat exchange medium that flows into the battery pack through the main inlet 121 may flow through the first main heat exchange flow path S1a and the first sub-heat exchange flow path S1b. The heat exchange medium that flows into the battery pack through the sub-inlets 122 may flow through the second heat exchange flow path S2.

The main inlet 121 may be provided to face the first battery module group 20. Accordingly, the heat exchange medium may flow into the first main heat exchange flow path S1a immediately after passing through the first battery module 20a. The first sub-heat exchange flow path S1b passes through the lower portion of the first battery module 20a. The first sub-heat exchange flow path S1b is directed into the first main heat exchange flow path S1a by the bottom member 160 so as to converge with the first main heat exchange flow path S1a to form the first heat exchange flow path S1. Accordingly, the heat exchange medium passing through the first main heat exchange flow path S1a is heat-exchanged with the first battery module 20a, and therefore, the temperature of the heat exchange medium is relatively increased.

The first sub-heat exchange flow path S1b passing through the lower portion of the first battery module 20a is a heat exchange medium that is not heat-exchanged with the first battery module 20a. The heat exchange medium passing through the first sub-heat exchange flow path S1b may be directed by the bottom member 160 through the first heat exchange flow path S1 to be heat exchanged with the second battery module 20b. Thus, it may be possible to efficiently cool down the first battery module group 20. Subsequently, the heat exchange medium heat-exchanged with the first battery module group 20 passes through the lower portion of the second battery module group 30 through the first convergence heat exchange flow path, as directed by the guide member 150. As such, the heat exchange medium heated through the heat exchange with the first battery module group 20 may be discharged through the outlet 130 without having and influence on the second battery module group 20.

The heat exchange medium that flows into the battery pack through the sub-inlets 122 is not heat-exchanged by passing between the first battery module group 20 and the inner surface of the housing 110 through the second heat exchange flow path P1. Accordingly, the temperature of the heat exchange medium that flows into the battery pack through the sub-inlets 122 may be remain almost unchanged. The flow path of the heat exchange medium may be diverted between the first and second battery module groups 20 and 30 by the side member 170. Thus, the heat exchange medium that flows into the battery pack through the sub-inlets 122 may be heat-exchanged with the third and fourth battery modules 30a and 30b of the second battery module group 30 by passing through the second convergence heat exchange flow path P2. In this case, the third distance d3 between the first and second battery module groups 20 and 30 is provided to be wider than the first or second distance d1 or d2 (see FIG. 5). Hence the heat exchange medium passing through the second heat exchange flow path P1 may be easily put together as the second convergence heat exchange flow path P2.

That is, the heat exchange medium that has flowed through the second heat exchange flow path P1, of which temperature is maintained, is discharged through the second convergence heat exchange flow path P2 while being heat-exchanged with the second battery module group 30. The heat exchange may be performed regardless of the portion in which the heat exchange medium is flowed, thereby improving the heat exchange efficiency of the battery pack 100. Accordingly, it may be possible to decrease a difference in temperature between the battery cells 10 and to easily control a difference in pressure according to the position of the heat exchange medium, caused by the flow of the heat exchange medium.

Although it has been described in this embodiment that the inlet 120 includes the main inlet 121 and the sub-inlets 122, and that the outlet 130 is integrally formed, in other implementations, other configurations for the inlet 120 and outlet, and the relationship between these and the first and second heat exchange flow paths and the first and second convergence heat exchange flow paths are possible.

Hereinafter, other embodiments will be described with reference to FIGS. 8 to 10. Contents of these embodiments, except the following contents, are similar to those of the embodiment described with reference to FIGS. 1 to 7, and therefore, their detailed descriptions will not be repeated.

Figure 8:
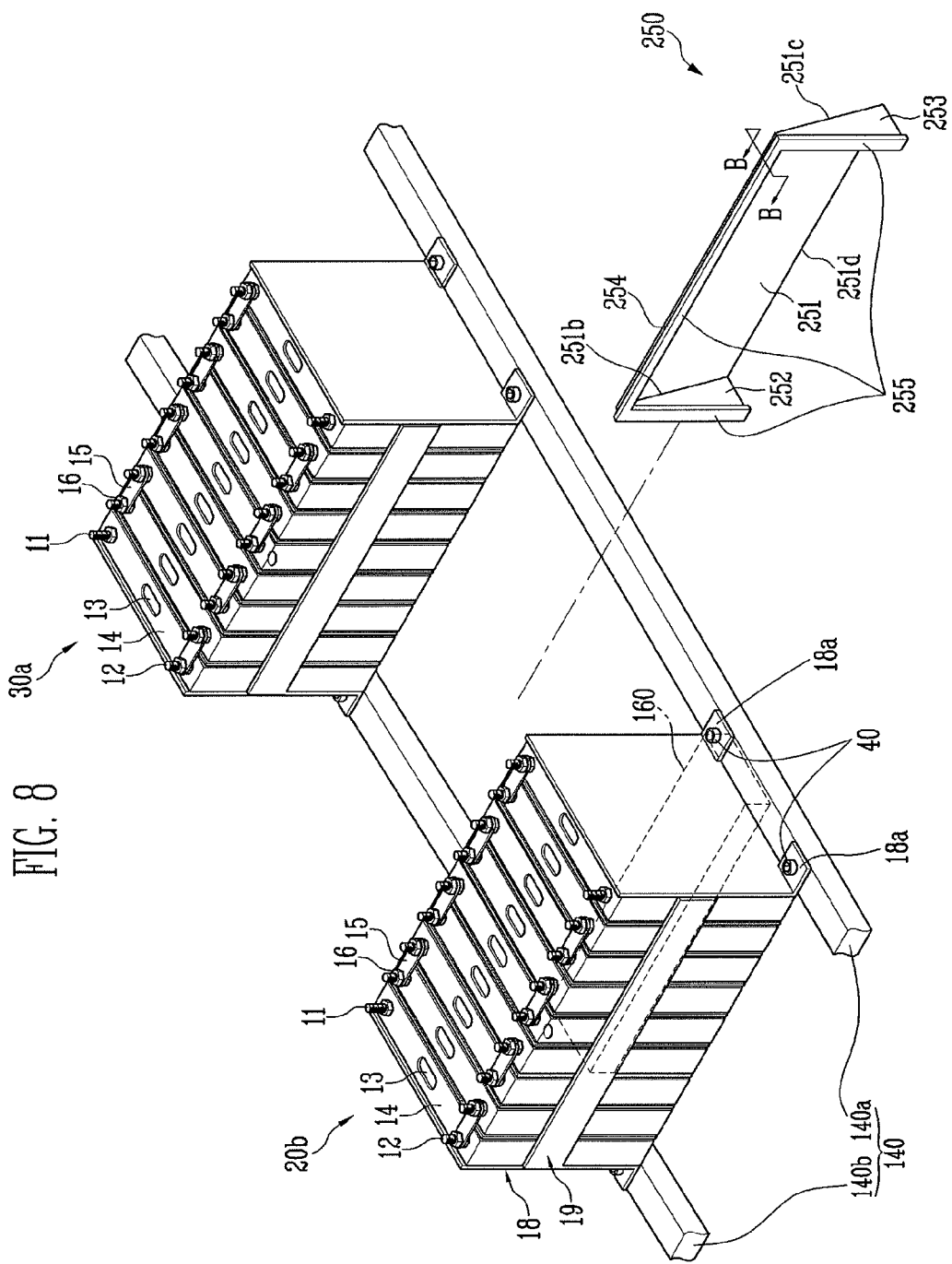
FIG. 8 illustrates a perspective view showing a battery module, a guide member, a support member, and a bottom member according to another embodiment.

FIG. 8 illustrates a perspective view showing a battery module, a guide member, a support member, and a bottom member according to another embodiment. FIG. 9 illustrates a sectional view of the guide member of FIG. 8.

Figure 9:
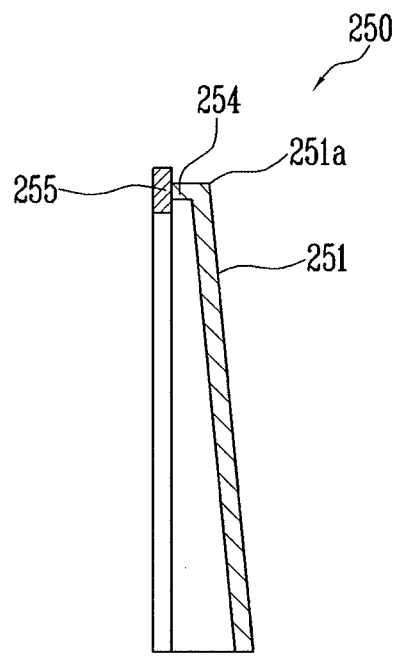
FIG. 9 illustrates a sectional view of the guide member illustrated in FIG. 8.

Referring to FIGS. 8 and 9, the guide member 250 may be provided to a side surface of the battery module 20b of the first battery module group, so as to enable the flow of the heat exchange medium passing through the first battery module group to be directed into the lower portion of the first battery module group. The guide member 250 may include a base portion 251 opposite to the side surface of the battery module 20b, an upper flange portion 254 extended to face the battery module 20b from an upper side 251a of the base portion 251, and first and second flange portions 252 and 253 respectively extending from one side 251b and the other side 251c of the base portion 251. The first and second flange portions 252 and 253 come in contact with the upper flange portion 254.

The guide member 250 may further include a joining portion 255 provided to extend through the first and second flange portions 252 and 253. The joining portion 255 may extend along surfaces of the base portion 251 and the first and second flange portions to be connected to a side surface of the battery module 20b of the first battery module group. According to this embodiment, the joining portion 255 may be further provided to the guide member 250, so that it may be possible to increase the contact area of the guide member 250 with the battery module 20b. Accordingly, the guide member 250 may be firmly coupled to the battery module 20b, regardless of the shape of the side surface of the battery module 20b.

Figure 10:
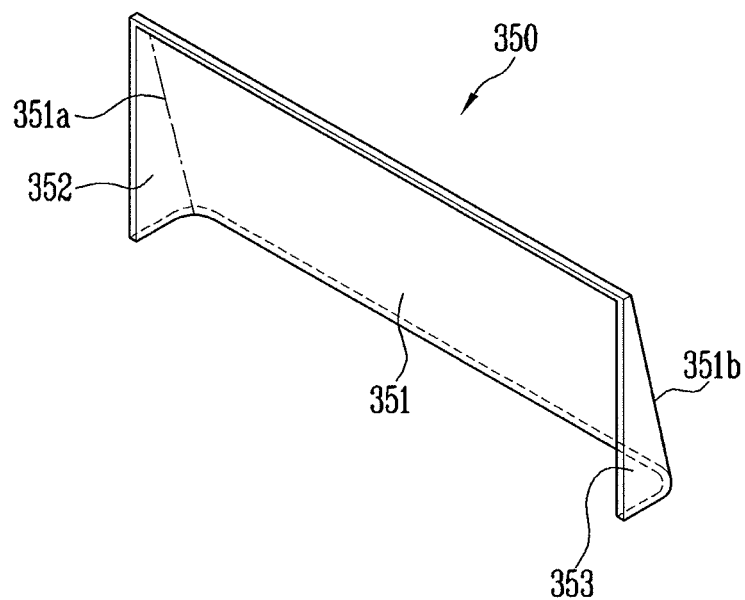
FIG. 10 illustrates a perspective view showing a battery module, a guide member, a support member, and a bottom member according to still another embodiment.

FIG. 10 illustrates a perspective view showing a battery module, a guide member, a support member, and a bottom member according to still another embodiment.

Referring to FIG. 10, the guide member 350 enables the flow of the heat exchange medium passing through the first battery module group to be directed into the lower portion of the first battery module group. The guide member 350 may include a base portion 351 provided to be inclined with respect to the battery module, and first and second flange portions 352 and 353 respectively extending toward the battery module from one end 351b and the other end 351c of the base portion 351. The portions of the first and second flange portions 352 and 353, respectively connected to the one end 351b and the other end 351c, may be formed in a rounded shape.

The heat exchange medium passing through the battery module is blocked by the guide member 350. Thus, the heat exchange medium advances toward a lower portion of the guide member 350. In this case, the inside of the guide member 350 may be formed in a curved shape, so that it may be possible to prevent turbulence from occurring in the heat exchange medium, thereby smoothly activating the flow of the heat exchange medium.

By way of summation and review, a battery module may be configured with a plurality of battery cells that transmit energy to an external electronic device through an electrochemical reaction. In this case, the battery cells generate heat during the electrochemical reaction. If the heat is accumulates, the battery cell may be deteriorated, and safety issues may arise in a serious case. Therefore, it is desirable to control the temperature of the battery cell.

Embodiments may provide a battery pack with improved heat exchange efficiency. Embodiments provide a battery pack the flow path of a heat exchange medium may be freely controlled. Embodiments also provide a battery pack in which reliability and safety may be improved by minimizing the difference in temperature between battery cells, using a member as described above.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A battery pack, comprising:
a first battery module group including one or more battery modules;
a second battery module group including one or more battery modules, the second battery module group being aligned with the first battery module group;
a guide member between the first and second battery module groups;
two or more support members that support bottom surfaces of the battery modules of the first and second battery module groups, the two or more support members being spaced apart from each other; and
a housing that accommodates the first and second battery module groups therein,
wherein the guide member is provided to a side surface of a first battery module of the first battery module group adjacent to the second battery module group so as to change a flow path of a heat exchange medium passing through the first battery module group, the guide member including a base portion opposite to the side surface of the first batter module, and first and second flange portions respectively at one side and an other side of the base portion, the base portion having an upper end connected to the first battery module and a lower end inclined to be spaced apart from the first battery module, and the first and second flange portions extending toward the first battery module at the one side and the other side of the base portion.

2. The battery pack as claimed in claim 1, further comprising a bottom member at a lower portion of the first battery module adjacent to the guide member.

3. The battery pack as claimed in claim 2, wherein a height of the bottom member corresponds to that of the support member.

4. The battery pack as claimed in claim 1, wherein:
the first and second battery module groups are aligned in a first direction so that side surfaces of the battery modules of the first and second battery module groups are opposite to each other, and
the support members extend in the first direction to collectively support the first and second battery module groups.

5. The battery pack as claimed in claim 4, wherein the support members include first and second support members arranged in parallel with each other.

6. The battery pack as claimed in claim 4, wherein the battery modules of the first and second battery module groups are mounted and fixed on the support members.

7. The battery pack as claimed in claim 1, wherein at least portions of the first and second flange portions have a rounded shape.

8. The battery pack as claimed in claim 1, wherein a vertical length from an upper end to a lower end of the base portion is about 60 to about 80% of the height of the first battery module.

9. The battery pack as claimed in claim 1, wherein:
the guide member further includes an upper flange portion extending toward the first battery module of the first battery module group adjacent to the second battery module group at an upper portion of the base portion, and
the first and second flange portions contact the upper flange portion.

10. The battery pack as claimed in claim 9, wherein:

the guide member further includes a joining portion that extends through the first flange portion, the upper flange portion, and the second flange portion, and the joining portion is connected to the side surface of the first battery module of the first battery module group.

11. The battery pack as claimed in claim 1, further comprising at least one side member, wherein the side member is provided between an inner surface of the housing and one of the battery modules of the second battery module group adjacent to the first battery module group.

12. The battery pack as claimed in claim 1, wherein:

the battery modules of the first battery module group are spaced apart from each other by a first distance, the battery modules of the second battery module group are spaced apart from each other by a second distance, the first and second battery module groups are spaced apart from each other by a third distance, and the third distance is greater than the first or second distance.

13. The battery pack as claimed in claim 1, wherein:

the housing includes a first surface having an inlet formed therein, and a second surface opposite to the first surface, the second surface having an outlet formed therein, the first and second battery module groups are sequentially aligned between the inlet and the outlet, and the first and second battery module groups include battery modules with side surfaces that are opposite to the inlet and the outlet.

14. The battery pack as claimed in claim 13, wherein the inlet includes a main inlet at a central portion thereof and one or more sub-inlets respectively provided at left and right sides of the main inlet while being spaced apart from each other with the main inlet interposed therebetween.

15. A battery pack, comprising:

a first battery module group including one or more battery modules;

a second battery module group including one or more battery modules, the second battery module group being aligned with the first battery module group;

a guide member between the first and second battery module groups, the guide member being provided to a first battery module of the first battery module group adjacent to the second battery module group so as to change of flow path of a heat exchange medium passing through the first battery module group;

two or more support members that support bottom surfaces of the battery modules of the first and second battery module groups, the two or more support members being spaced apart from each other;

a housing that accommodates the first and second battery module groups therein:

a first main heat exchange flow path that passes through the first battery module group;

a first sub-heat exchange flow path that passes between the neighboring support members at a lower portion of the first battery module group;

a first convergence heat exchange flow path that passes between neighboring support members at a lower portion of the second battery module group;

one or more second heat exchange flow paths that pass between an outer surface of the first battery module group and an inner surface of the housing; and a second convergence heat exchange flow path that passes through the second battery module group, wherein:

the first main heat exchange flow path and the first sub-heat exchange flow path combine to form a first heat exchange flow path such that the first heat exchange flow path is connected to the first convergence heat exchange flow path by the guide member, and the one or more second heat exchange flow paths combine to form the second convergence heat exchange flow path at a rear stage of the guide member.

16. The battery pack as claimed in claim 15, wherein:

the battery pack further includes a bottom member at a lower portion of the first battery module adjacent to the guide member, the one or more second sub-heat exchange flow paths combine with the first main heat exchange flow path at a front stage of the bottom member so as to become the first heat exchange flow path, and the first heat exchange flow path is connected to the first convergence heat exchange flow path by the guide member.

17. The battery pack as claimed in claim 15, wherein:

the housing includes a first surface having an inlet formed therein, and a second surface opposite to the first surface, the second surface having an outlet formed therein, the inlet includes a main inlet at a central portion thereof and one or more sub-inlets respectively provided at left and right sides of the main inlet while being spaced apart from each other with the main inlet interposed therebetween, the first main heat exchange flow path and the first sub-heat exchange flow path communicate with the main inlet, the one or more second heat exchange flow paths communicate with the one or more sub-inlets, and the first and second convergence heat exchange flow paths communicate with the outlet.

18. The battery pack as claimed in claim 15, wherein:

the housing includes a first surface having an inlet formed therein, and a second surface opposite to the first surface, the second surface having an outlet formed therein, the inlet includes a main inlet at a central portion thereof and one or more sub-inlets respectively provided at left and right sides of the main inlet while being spaced apart from each other with the main inlet interposed therebetween a heat exchange medium that flows into the battery pack through the main inlet flows through the first main heat exchange flow path and the first sub-heat exchange flow path, and a heat exchange medium that flows into the battery pack through the one or more sub-inlets flows through the one or more second heat exchange flow paths.

* * * * *